INVENTORS
KENNETH LANCASTER
PETER CHARLES PUGSLEY
BASIL AMORY TURNER
BY
Kirschstein, Kirschstein & Ottinger
ATTORNEYS INVENTORS
KENNETH LANCANSTER
PETER CHARLES PUGSLEY
BASIL AMORY TURNER
BY Kenschlen, Kenschlen & Ottinger
ATTORNEYS

ANALOGUE TO DIGITAL CONVERTER UTILIZING E HEAD SENSING

Filed April 8, 1960 6 Sheets-Sheet 3

INVENTORS
KENNETH LANCASTER
PETER CHARLES PUGSLEY
BASIL AMORY TURNER
BY Kirschstein, Kirschstein & Ottinger
ATTORNEYS INVENTORS
KENNETH LANCANSTER
PETER CHARLES PUGSLEY
BASIL AMORY TURNER
BY Kirschstein, Kirschstein + Ottinger
ATTORNEYS

ANALOGUE TO DIGITAL CONVERTER UTILIZING E HEAD SENSING

Filed April 8, 1960 6 Sheets-Sheet 5

INVENTORS
KENNETH LANCANSTER
PETER CHARLES PUGSLEY
BASIL HAVORY TURNER
BY Kirschstein, Kirschstein & Ottinger
ATTORNEYS

ANALOGUE TO DIGITAL CONVERTER UTILIZING E HEAD SENSING

Filed April 8, 1960 6 Sheets-Sheet 6

INVENTORS
KENNETH LANCASTER
PETER CHARLES PUGSLEY
BASIL AMORY TURNER
BY Kirschstein, Kirschstein & Ottinger
ATTORNEYS United States Patent Office 3,213,443

Patented Oct. 19, 1965

3,213,443

ANALOGUE TO DIGITAL CONVERTER UTILIZING E HEAD SENSING

Kenneth Lancaster, Oxhey, Peter Charles Pugsley, Hatch End, and Basil Amory Turner, London, England, assignors to The General Electric Company Limited, London, England Filed Apr. 8, 1960, Ser. No. 20,997

Claims priority, application Great Britain, Apr. 10, 1959, 12,202/59

4 Claims. (Cl. 340—347)

Figure 1:
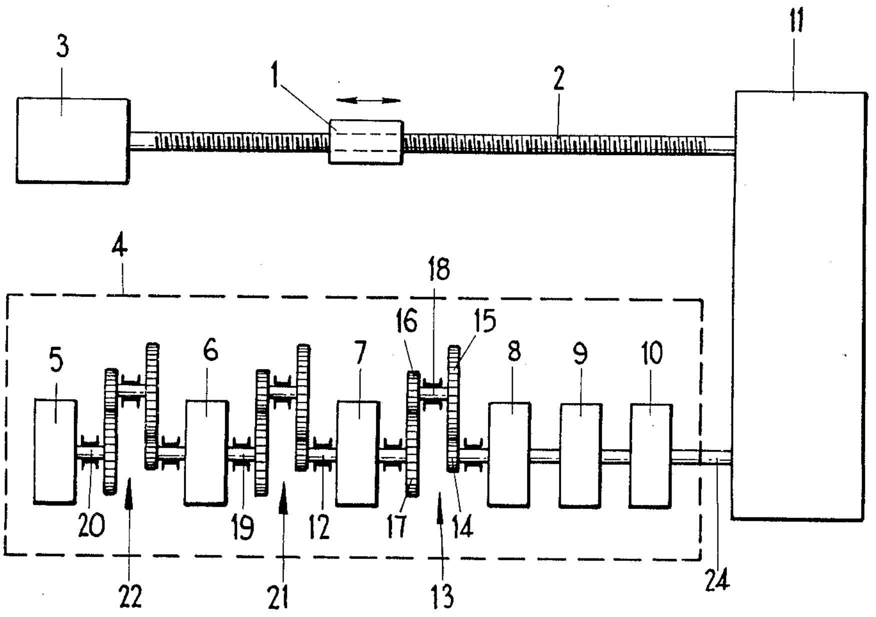

This invention relates to position encoding apparatus.

More particularly the invention is concerned with apparatus for supplying a plurality of electric signals which represent positional information.

In position encoding apparatus in accordance with the present invention, a member and a plurality of sensing devices are arranged for relative movement and the sensing devices are arranged to co-operate, at any particular instant, with different portions of the member respectively, these portions all lying on a common track and the sensing devices being adapted each to supply an electric signal which is characteristic of a physical property of said co-operating portion of the member whereby the combination of signals supplied by said sensing devices is characteristic of the relative position of said member and said sensing devices.

The relative movement of the member and the sensing devices may be rectilinear or rotary and in either case, the signals supplied by the sensing devices characterise the relative position of the member with respect to the sensing devices appropriate to that movement. The sensing devices may be electromagnetic. If there are five sensing devices, the signals supplied thereby may characterise the relative position according to the code set out hereinafter in the table.

According to a feature of the present invention, position encoding apparatus comprises a wheel having an annular portion which is coaxial with the axis about which the wheel can rotate and which is made up of sections having two values of a physical property, sections having the two values alternating throughout said annular portion, and a plurality of sensing devices which are adapted to co-operate with said annular portion of said wheel so as each to supply an electric signal which has a parameter with one of two values depending upon the value of said physical property of the particular section of said annular portion co-operating with the sensing devices at any time, the electric signals supplied by said sensing devices being together characteristic of the angular position of said wheel.

The annular portion of the wheel may have only two of said sections in which case there is only one section with each of the two values of said physical property. Alternatively there may be a larger number of sections.

Preferably the wheel, or at least said annular portion thereof, is of ferromagnetic material and the sensing devices are each formed by a transformer, the annular portion being contoured to provide said sections so that the reluctance of a magnetic path associated with each transformer is dependent upon the particular section of the annular portion co-operating therewith at any time. The wheel may, in fact, have a further annular portion arranged in similar manner to the first mentioned annular portion, corresponding sections of the two annular portions being staggered, and each sensing device being formed by an E-shaped ferromagnetic core which has coils on the three arms thereof, these coils being connected so as to constitute primary and secondary windings of the transformer so that when the primary winding is excited with electric oscillations, the phase of the oscillations supplied by the secondary winding has one of two values depending upon the position of the wheel.

For the purpose of characterising more precisely the position of a shaft which carries said wheel or of a member coupled to said shaft either directly or through gearing, apparatus in accordance with the present invention may also include one or more further wheels each associated with a plurality of sensing devices in the manner previously set out, the combination of signals supplied by all said sensing devices being characteristic of the position of said shaft or of the member coupled thereto.

Figure 2:
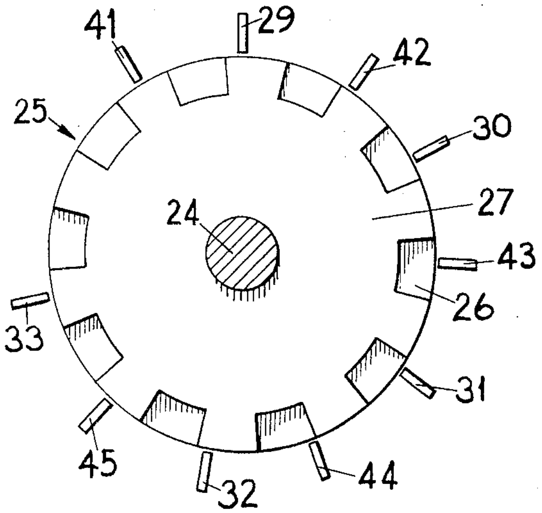
Figure 3:
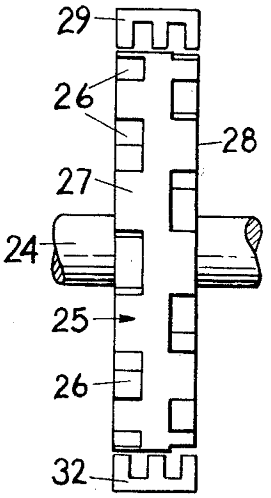
Figure 4:
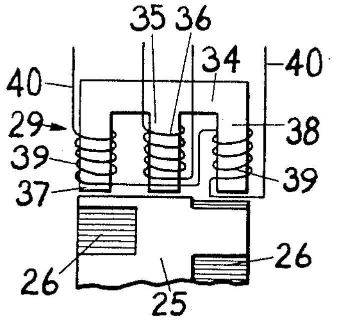
Figure 5:
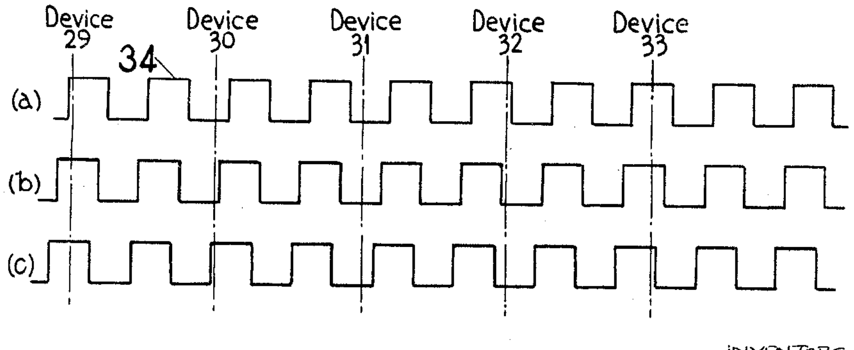
Figure 6:
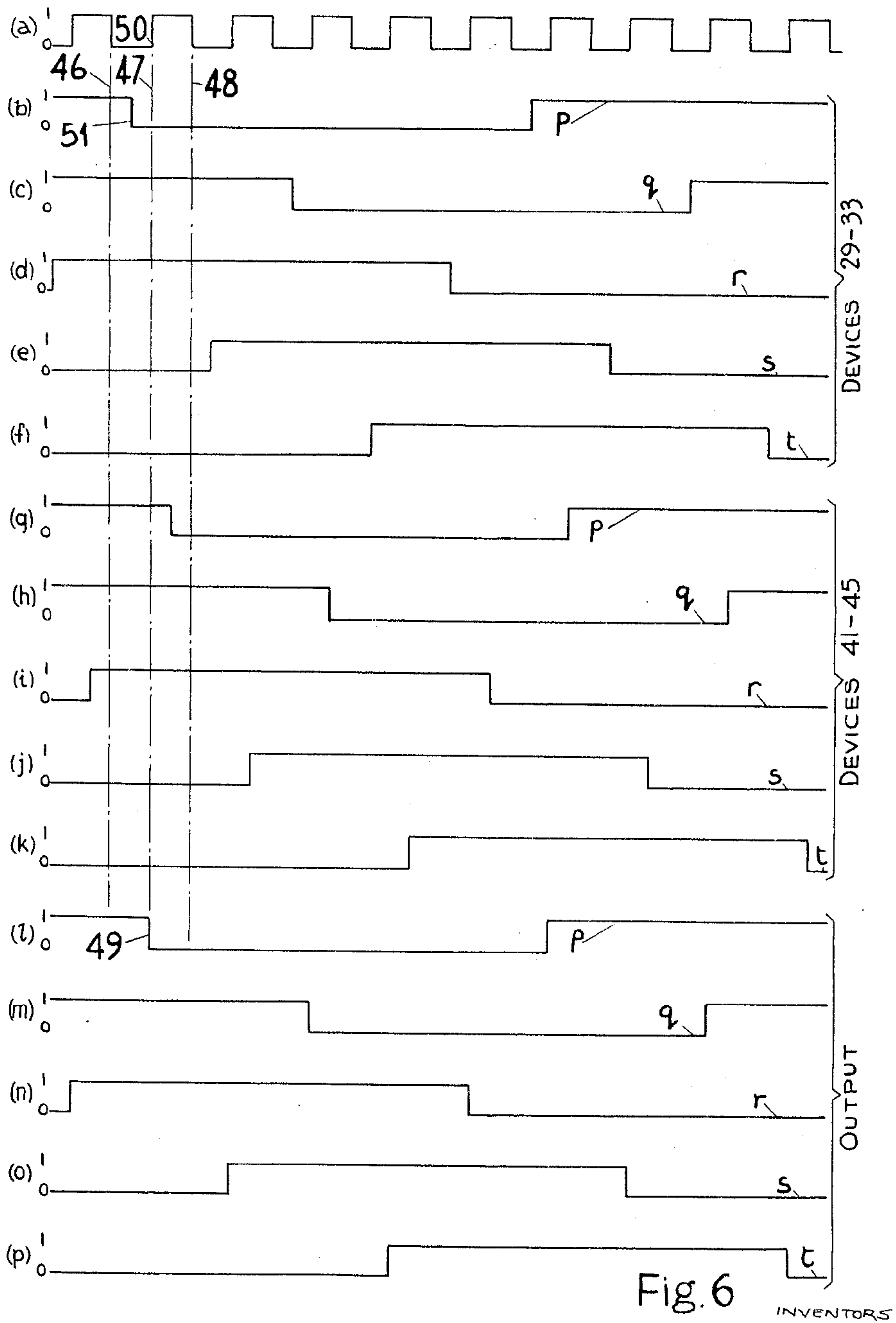
Figure 7:
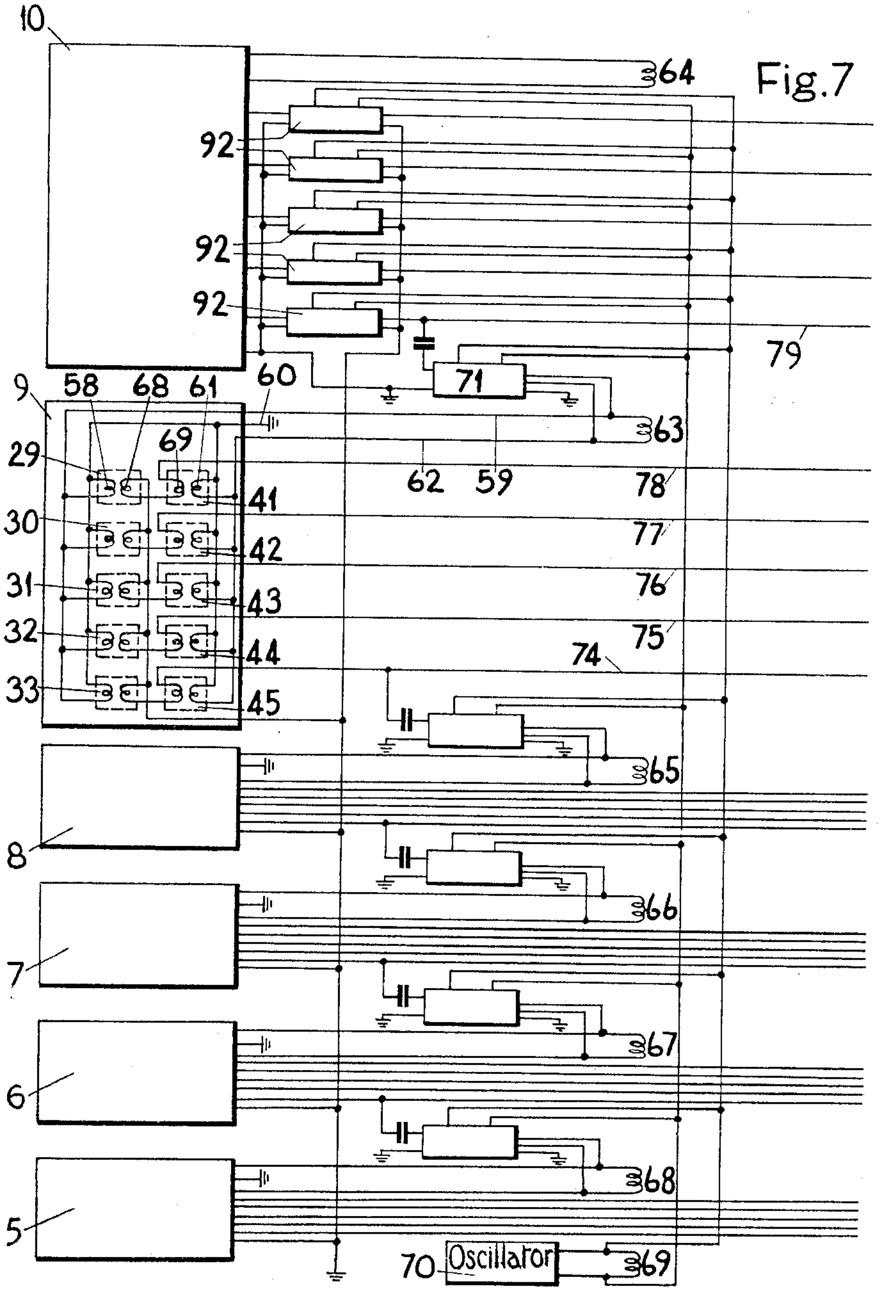
Figure 8:
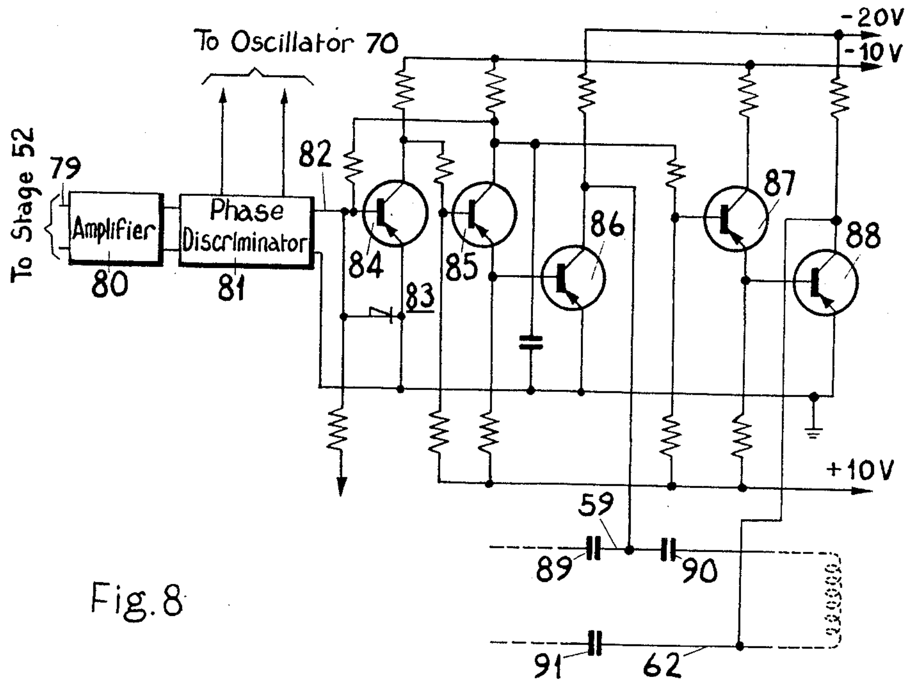
Figure 9:
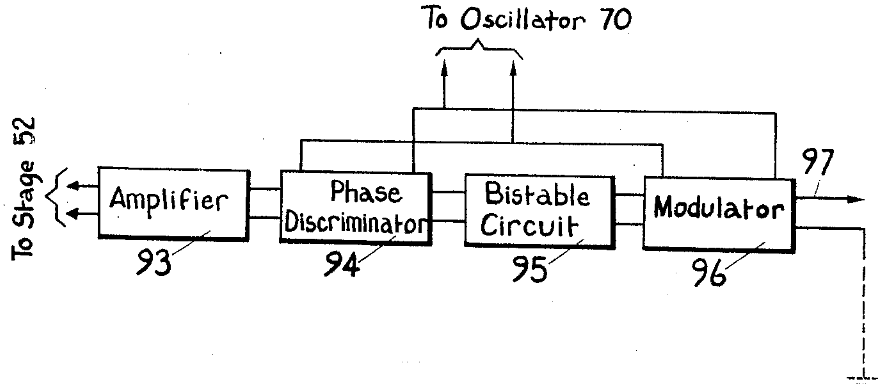

One example of apparatus in accordance with the present invention for supplying electric signals that are characteristic of the position of a nut on a lead screw will now be described with reference to the accompanying drawings in which FIGURE 1 shows a general arrangement of the apparatus, the nut and the lead screw, FIGURES 2 and 3 show diagrammatically front and side elevations respectively of part of the apparatus, FIGURE 4 shows a fragment of FIGURE 3 in more detail, FIGURES 5 and 6 are explanatory diagrams, FIGURE 7 shows diagrammatically the electric circuit of the complete apparatus, FIGURES 8 and 9 show parts of the electric circuit of FIGURE 7 in more detail.

Figures 10, 11, 12, 13, 14:
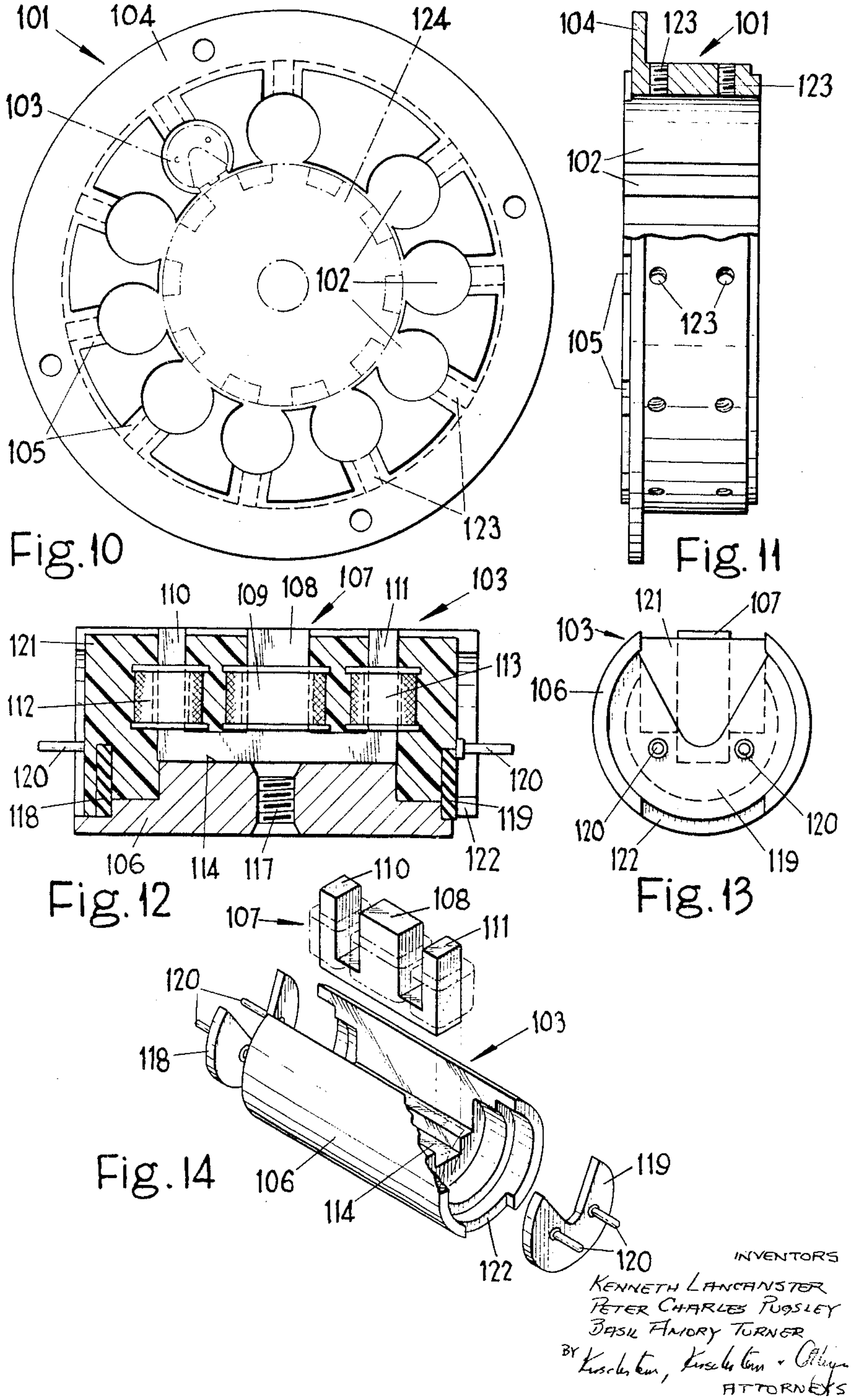

FIGURES 10 and 11 show front and side elevations respectively of the part of the apparatus shown diagrammatically in FIGURES 2 and 3, FIGURE 11 being partly in section, FIGURES 12 and 13 show a sectional front elevation and end elevation respectively of an element of FIGURE 10, these two figures being to a larger scale than FIGURE 10 and FIGURE 14 shows an exploded view of the element of FIGURES 12 and 13.

Referring now to FIGURE 1, the said nut, which has the reference numeral 1, is provided with means (not shown) to restrain it from rotating and accordingly when the lead screw 2 is rotated, by being driven by a reversible electric motor 3, the nut 1 is caused to move along the lead screw 2. The apparatus which is now to be described and which has the general reference 4, is required to supply information as to the number of complete revolutions of the lead screw 2 necessary to bring the nut 1 from some arbitary (and possible imaginary) position, which is so chosen that the number of revolutions are always of the same sense, and also the angular position of the lead screw 2. In fact the apparatus 4 supplies electric oscillations which provide a parallel representation of a six digit decimal number which is equal to the distance in inches of the nut 1 from the arbitary position, the decimal point occurring after the second digit. The lead screw 2 has ten threads per inch and accordingly the number of complete revolutions of the lead screw 2 gives the three most significant digits of said number, these digits representing the position of the nut in tens, units and tenths (measured in inches).

The apparatus 4 has six separate stages 5 to 10 which are arranged to give binary-coded representations of the six digits respectively of the six digit decimal number which is characteristic of the position of the nut 1, the stages 5, 6 and 7 being associated with the tens, units and tenths digits respectivley while the stages 8, 9 and 10 are concerned with the remaining three digits in decreasing order of significance. In fact the stages 8, 9 and 10 are directly connected to a shaft 24 which is coupled to the lead screw 2 by way of gearing which is represented in FIGURE 1 by the rectangle 11 and which has a gear ratio of unit. The stage 7 is connected to a shaft 12 which is coupled to the shaft 24 by way of gearing 13. The gearing 13 comprises a first train of gears 14 and 15 and a second train of gears 16 and 17, the ratio of the gears 14 and 15 being one to four and the ratio of the gears 16 and 17 being two to five. The gears 15 and 16 are connected by a shaft 18 so that the overall ratio of the gearing 13 is ten to one. Similarly the stages 5 and 6 are connected to the shafts 19 and 20 respectively, gearing 21 and 22 each of which is the same as the gearing 13, being provided between the shafts 12 and 19 and between the shafts 19 and 20.

Referring now also to FIGURES 2 and 3, the stage 9, that is to say the stage associated with the second least significant decimal digit, comprises a wheel 25 carried on the shaft 24, the wheel 25 having ten slots 26 in each of its major faces 27 and 28. The slots 26 in each of the faces 27 and 28 are regularly spaced and the angle subtended at the axis of revolution of the wheel 25 by each slot is equal to the corresponding angle subtended by the tooth which is left between each adjacent pair of slots in one face of the wheel. The walls 26 in the two faces 27 and 28 are staggered by this angle and twice this angle is subsequently referred to as the "pitch angle." Although in the embodiment under consideration the angles subtended by a tooth and by a slot are equal, it is to be understood that this is not an essential feature and that if they are unequal the "pitch angle" is then equal to the sum of the two individual angles.

Around the circumference of the wheel 25 there are provided five electro-magnetic sensing devices 29, 30, 31, 32 and 33 which are fixed and which are arranged each to provide an electrical signal that is dependent upon whether the portion of the circumference of the wheel 25 under the sensing device has a slot 26 in either the face 27 or in the face 28. (It will be appreciated that for all positions of wheel 28 the portion thereof under any one of the sensing devices 28 to 33 has a slot in one or other of the face 27, 28).

Referring now also to FIGURE 4, the sensing device 29, for example, comprises a E-shaped ferromagnetic core 34, which may be of ferrite material, the centre arm 35 of the core 34 carrying an input coil 36 while the outer arms 37 and 38 carry two output coils 39 which are connected in series opposition. The coil 36 and the coils 39 act as primary and secondary windings respectively of a transformer, the magnetic paths linking there coils passing through that portion of the wheel adjacent to the core 34 so that, depending upon the position of the wheel 25, there is usually unequal coupling between the coil 36 and the coils 39. During operation, the input coil 36 is supplied with oscillations of frequency 15 kilocycles per second and oscillations of that frequency are therefore passed to the output leads 40 with a phase depending upon whether the portion of the circumference of the wheel under the device 29 contains a slot 26 in the face 27 or in the face 28. Under one of these two conditions the output oscillations are in phase with the input oscillations while in the other condition the output oscillations are in antiphase with the input oscillations, the change-over from either condition to the other as the wheel 25 is rotated being rapid.

The five sensing devices 29 to 33 are spaced apart round the wheel 25 so that the angle between each adjacent pair of devices is equal to an integral multiple of the pitch angle minus one fifth of the pitch angle. The positions of the devices 29 to 33 relative to the wheel 25 are shown diagrammatically in FIGURE 5(*a*) in which the line 34 represents a development of the profile of the wheel 25. It will be appreciated that if the phase of the output oscillations supplied by the sensing devices 29 and 30 are designated by the symbols "1" and "0" respectively, then the output oscillations of the devices 31, 32 and 33 correspond to "0", "1" and "1" respectively.

If now the situation is considered when the wheel 25 has been rotated through one tenth of a pitch so as to take up the position shown diagrammatically in FIGURE 5(*b*), the output oscillations supplied by the devices 29 to 33 are "1," "0," "0," "0" and "1" respectively. Rotating the wheel 25 again through one tenth of a pitch brings the wheel to the position shown diagrammatically in FIGURE 5(*c*) and in this case, the devices 29 to 33 supply oscillations corresponding in "1," "1," "0," "0" and "1" respectively.

More generally as the shaft 24 is rotated through an angle equal to the pitch angle (which it will be appreciated effectively brings the wheel 25 to a position which is indistinguishable from its original position), the sensing devices 29 to 33 supply oscillations carrying the information of the digits *p, q, r, s* and *t* respectively as given in the following table:

*Table 1*

| Decimal Number | Binary representation | | | | |
|---|---|---|---|---|---|
| | *p* | *q* | *r* | *s* | *t* |
| 0 | 1 | 0 | 0 | 1 | 1 |
| 1 | 1 | 0 | 0 | 0 | 1 |
| 2 | 1 | 1 | 0 | 0 | 1 |
| 3 | 1 | 1 | 0 | 0 | 0 |
| 4 | 1 | 1 | 1 | 0 | 0 |
| 5 | 0 | 1 | 1 | 0 | 0 |
| 6 | 0 | 1 | 1 | 1 | 0 |
| 7 | 0 | 0 | 1 | 1 | 0 |
| 8 | 0 | 0 | 1 | 1 | 1 |
| 9 | 0 | 0 | 0 | 1 | 1 |

The arrangement of the devices 29 to 33 is thus such that the output oscillations supplied thereby represent the digits *p, q, r, s* and *t* of the above code for all positions of the wheel 25. These oscillations, therefore, define, at any instant, the fifth digit of the said decimal number which characterises the position of the nut 1 on the lead screw 2. It will be noted, moreover, that the code is one in which the binary representation of any two successive values of the decimal number differ in only one digit. (For this purpose the numbers "0" and "9" can be considered as being successive as "0" follows "9" in the normal decimal system of numbering).

The stages 8 and 10 of the apparatus 4 are generally similar to the stage 9 and each comprises a slotted wheel and five sensing devices which are spaced apart around the associated wheel and which have the same construction as the sensing device 29 described above. Thus, in addition to the wheel 25, the shaft 24 also carries two other slotted wheels (not shown) which are associated with the stages 8 and 10 respectively. The wheel associated with the stage 8 has only one "slot," which subtends an angle of 180°, in each face and the five sensing devices associated therewith are spaced 72° apart. The wheel associated with the stage 10 has one hundred slots in each face and the angle between each adjacent pair of the sensing devices of this stage are spaced apart round the wheel so that the angle between each adjacent pair of devices is equal to an integral multiple of the pitch angle minus one fifth of the pitch angle.

The stages 8 and 10 operate to code the angular position of the shaft 24 in similar manner to the stage 9. It will be appreciated, therefore, that the digit oscillations supplied by the sensing devices of the stages 8 and 10 define the fourth and sixth digits respectively of the said decimal number which characterises the position of the nut 1.

The stages 5, 6 and 7 of the apparatus 4 have exactly the same construction as the stage 10. It will be recalled that the stages 5, 6, 7 and 8 are coupled by gearing 13, 21 and 22 and accordingly the output oscillation supplied by the three groups of sensing devices (not shown) of the stages 5, 6 and 7 represent the three most significant digits respectively of the said decimal number which characterises the position of the nut 1.

For ease of manufacture, the wheel 25 of the stage 9 is somewhat smaller than the corresponding wheel of the stage 10 and somewhat larger than the corresponding wheels of the stages 5, 6, 7 and 8. In order to reduce the total space taken up by the apparatus 4, the three shafts 12, 19 and 20 are preferably disposed symmetrically around the longitudinal axis of the shaft 24 so that these shafts are parallel to the shaft 24 and the three wheels carried thereby lie side by side.

The apparatus as so far described is capable of giving a false binary representation of the position of the nut 1. The reason for this is that although, as previously noted, the code set out in the table is such that only one binary digit changes at a time, this is only true for each decimal digit and does not apply when two or more decimal digits are required to change simultaneously since there is then essentially a change in the binary representation of each of these decimal digits. For example, if the stages 5 and 6, say, of the apparatus 4 are supplying oscillations which represent the number "19" and the nut 1 is then moved, by rotation of the lead-screw 2, to a position corresponding to the number "20," it is necessary for the binary representation supplied by each of the stages 5 and 6 to change. However the tolerances in the manufacture of the said wheels of the two stages 5 and 6, and the positioning of the associated sensing devices, may be such that the stage 6 providing the binary representation of the less significant decimal digit changes from giving a representation of "9" to giving a representation of "0" shortly before there is any change in the representation supplied by the stage 5. In other words, continuous movement of the nut 1 would result in the two stages of the apparatus under consideration providing electric oscillations which characterise the decimal numbers "19," "10" and "20" in turn.

In order to prevent the apparatus operating in the manner discussed in the last paragraph, each of the stages 5 to 9 is controlled by the output of the stage associated with the next decimal digit of lower significance. From the table it will be noted that, when changing from "9" to "0," only the *p* digit of the binary representation changes and accordingly the output oscillations of each of the stages 6 to 10 corresponding to the *p* digit are utilised to control the stage associated with the next most significant decimal digit.

Considering now the stage 9 of the apparatus 4 associated with the second least significant decimal digit and referring again to FIGURE 2, there are provided another group of sensing devices 41 to 45. This group of devices 41 to 45 is arranged in exactly the same manner as the group of devices 29 to 33 hereinbefore described so as to supply five electric oscillations the phases of which define the angular position of the shaft 24, the corresponding devices (for example the devices 29 and 41 both of which supply oscillations in respect of the binary digit *p*) being spaced apart by an angle equal to nineteen twentieths of the pitch angle.

The two groups of sensing devices 29 to 33 and 41 to 45 are disposed so as to provide the binary coding shown diagrammatically in FIGURE 6. The curve of FIGURE 6(*a*) represents the *p* digit of the binary representation of the least significant decimal digit while the curves (*b*) to (*f*) and (*g*) to (*k*) represent the binary digits of the coding effected by the wheel 25 and the groups of sensing devices 29 to 33 and 41 to 45 respectively, all the curves in this figure being drawn so that the lower level corresponds to "0" and the upper level corresponds to "1." The arrangement is such that these codings are combined to give the resultant coding of the stage under consideration by selecting the coding of the group of devices 29 to 33 when the *p* digit, represented in FIGURE 6(*a*), has the value "1" and the coding of the other group when this digit has the value "0," curves (*l*) to (*p*) in this figure showing the resultant coding.

Considering now the derivation of the *p* digit shown in FIGURE 6(*l*), it will be realised from the above that at positions between the broken lines 46 and 47 the representation of this digit is supplied by the sensing device 41. At the position represented by the line 47, there is a change-over and the representation of this digit is supplied by the sensing device 29, this condition prevailing for all positions between the lines 47 and 48. In other words, the step 49 in the curve of FIGURE 6(*l*) coincides with the step 50 in the curve of FIGURE 6(*a*) with the result therefore that the position of the step 51 in the curve of FIGURE 6(*b*), for example, is not critical and can occur anywhere between the lines 46 and 47 without affecting the overall accuracy of coding.

FIGURE 7 shows diagrammatically the electric circuit of the apparatus 4, and that part of the circuit associated with the stage 9 will now be considered. The primary windings, such as the winding 58 which corresponds to the coil 36 in FIGURE 4, of all the sensing devices 29 to 33 are connected in parallel across the leads 59 and 60 while the primary windings, such as the winding 61, of all the sensing devices 41 to 45 are connected in parallel across the leads 60 and 62. The leads 59 and 62 are connected to a secondary winding 63 of a transformer which has further secondary windings 64 to 68 which are associated with the other stages 5, 6, 7, 8 and 10 of the apparatus and a primary winding 69 which is connected to an oscillator 70 having a frequency of 15 kilocycles per second.

A device 71 is connected to the leads 59, 60 and 62 and is arranged selectively to short circuit either the leads 59 and 60 or the leads 60 and 62. In this manner the primary windings of only one of the two groups of sensing devices 29 to 33 and 41 to 45 are energised from the oscillator 70 at any time. The secondary windings, such as the windings 72 and 73 each of which corresponds to the coils 39 in FIGURE 4, of the two sensing devices associated with each binary digit are connected in series and the device 71 is caused to be operated to select one or other of the two groups of sensing devices in the manner previously described with reference to FIGURE 6 with the result that oscillations representing the digits *p*, *q*, *r*, *s* and *t* corresponding to the appropriate decimal digit are supplied by the stage 53 to the leads 74 to 78 respectively.

The device 71 is controlled by the phase of the oscillations on the lead 79, these oscillations representing the digit *p* of the least significant decimal digit which is coded by the stage 52. Referring now to FIGURE 8, the device 71 comprises an amplifier 80 which is arranged to pass the oscillations on the lead 79 to a phase discriminator 81 where the phase of those oscillations is compared with that of oscillations supplied by the oscillator 70. The output voltage supplied by the discriminator 81 to a lead 82 has either a positive or negative value depending upon the phase of the oscillations on the lead 79 and this voltage is utilised to control a bistable circuit 83 which is formed by two transistors 84 and 85. When the voltage on the lead 82 has its negative value, the transistor 84 is conducting and the transistor 85 is cut-off while when the voltage on the lead 82 has its positive value, the conditions of the transistors 84 and 85 are reversed.

The voltage developed at the emitter electrode of the transistor 85 is applied to the base electrode of a transistor 86 which is arranged to act as a switch. When the transistor 85 is conducting, the bias thus applied to the base electrode of the transistor 86 causes that transistor to be conducting with the result that there is a low impedance path between the emitter and collector electrodes of the transistor 86, these electrodes being connected to earth and to the lead 59 respectively. The collector electrode voltage of the transistor 85 is passed through a transistor 87 to a transistor 88 which is arranged as a switch in similar manner to the transistor 86. In this case the collector electrode of the transistor 88 is connected to the lead 62 so that when the bistable circuit 83 is operated so that the transistor 85 thereof is cut-off, the transistor 88 provides a low impedance between the lead 62 and earth.

D.C. blocking capacitors 89, 90 and 91 are provided in the leads 59 and 62 so as to prevent undesirable coupling between the transistors 86 and 88 but in order to simplify the drawing, these capacitors are not shown in FIGURE 7.

The stages 5 to 8 of the apparatus are arranged in exactly the same manner as the stage 9 to prevent a false binary representation being provided by any one of those stages.

It will be appreciated that each of the stages 5 to 9 is in effect controlled by the output of the stage 10. In practice there are occasions when the binary representation provided by the stage 10 only changes relatively slowly and so as to prevent there being any possibility of uncertainty as to the binary representation provided by the stage 10, there are provided five devices 92.

Referring now to FIGURE 9, each of the devices 92 comprises an amplifier 93 and a phase discriminator 94 which is arranged to compare the phase of the oscillations supplied by the amplifier 93 with oscillations supplied by the oscillator 70. Under normal conditions the output of the phase discriminator will have one of two values depending upon the value of the appropriate binary digit but as stated above, there may be some uncertainty under some conditions as to the value of the digit represented by the output voltage of the phase discriminator. To resolve this ambiguity, the output voltage of the phase discriminator 94 is utilised to control a bistable circuit 95 which is arranged to take up one of its stable conditions for each of the two normal values of the voltage supplied by the discriminator. The output of the bistable circuit 95 is passed to a modulator 96 where it is used to modulate the oscillations supplied by the oscillator 70. The oscillations supplied by the modulator 96 to the lead 97 are thus arranged either to be in phase or in antiphase with the oscillations supplied by the oscillator 70 in dependence upon the value of the binary digit to be represented thereby without the ambiguity previously mentioned.

The output oscillations of the apparatus, for example the oscillations on the leads 74 to 78, may be utilised in various ways, for example the oscillations on each of the output leads may be supplied to an associated phase discriminator which is arranged to supply a unidirectional output voltage dependent upon the value of the appropriate binary digit. If information in respect of the six decimal digits is only required digit by digit, the oscillations supplied by the six stages 5 to 10 may be passed to six gating devices respectively. When any particular one of the decimal digits is to be selected, the five oscillations characterising that digit are passed through one of these gating devices to five output leads which are common to all the six gating devices. The oscillations on these five output leads may be passed to five phase discriminators for the purpose of deriving unidirectional voltages which represent the five binary digits corresponding to the selected decimal digit.

It will be appreciated that the overall accuracy of coding of the example of apparatus described above is determined by the accuracy of the stage 52 associated with the least significant decimal digit. In order that this stage shall have as high accuracy as possible, the construction of the wheel and associated five sensing devices may be somewhat different from that previously described. In one construction, the said wheel in this stage is formed by two separate toothed wheels the teeth of which are hobbed simultaneously. After hobbing, the two toothed wheels are moved so that the teeth of one wheel are in register with the slots in the other wheel and the two toothed wheels are clamped together in this position to form the resultant wheel of this stage of the apparatus. Furthermore, instead of the sides of the teeth being radial, as previously described, the slots may be more V-shaped with chamfered portions at the top and bottom of each tooth.

So that the position of each sensing device of the stage 52 can accurately be set, each of these devices may be provided with means to adjust the angular position of the sensing device about the axis of rotation of the wheel, means to adjust the angular position of the device about a radius of the wheel, and means to adjust the angular position of the device about an axis through the device that lies in the plane of the wheel and which is perpendicular to said radius through the device. The last mentioned means enables the sensing device to be adjusted so that the oscillations supplied thereby are balanced.

In a preferred construction of the apparatus 4 each of the stages 5 to 10 has its sensing devices located in cylindrical holes in a metal stator, the position and dimensions of each of these holes being accurately determined. In FIGURES 10 and 11 of the accompanying drawings there is shown such a stator 101 which is suitable for the stage 9 of the apparatus 4. This stator 101 has ten holes 102 which pass right through it and in one of these holes 102 there is shown a sensing device 103 in broken outline. The end face 104 of the stator 101 is provided with radial slots 105 which are each associated with one of the holes 102 and which are accurately located with respect to those holes.

The manner of operation of the sensing device 103 is essentially the same as that of the device 29 (FIGURE 4) and, referring now to FIGURES 12 and 13, comprises a sleeve 106 which supports an E-shaped ferrite core 107, the centre arm 108 of the core carrying a primary coil 109 while the output arms 110 and 111 carry secondary coils 112 and 113 respectively. The outside diameter of the sleeve 106 is such that it is a push fit in any one of the holes 102 in the stator 101 and the device 103 is manufactured, in a manner now to be described, so that when in position of a hole 102 the free ends of the arms 108, 110 and 111 are accurately located.

FIGURE 14 shows the sleeve 106 and the core 107 in more detail these two items being glued together while they are accurately located relative to one another by means of a special jig (not shown). For this purpose, the core 107 is placed approximately in position in the channel 114, the bottom of this channel and the back edge of the core 107 having previously been coated with a suitable glue, for example, an epoxy resin. The sleeve 106 and the core 107 are then placed in a cylindrical recess in the jig and a part of this jig is placed so as to embrace the ends of the core 107. This part consists of a central portion having a flat surface opposite the free ends of the arms 108, 110, and 111 and two arms which extend generally at right angles from the extremities of the central portion. This part is screwed down so that the tips of the said end portions abut against further parts of the jig and there is then a small gap between the ends of the arms 108, 110 and 111 of the core 107 and said flat surface. A screw (not shown) is then screwed into the threaded hole 117 which passes through the bottom of the sleeve 106. This screw is tightened up so as to force the ends of the arms 108, 110 and 111 of the core 107 against said surface of said part of the jig. The glue between the sleeve 106 and the core 107 takes up the gap therebetween and this glue is then allowed or caused to set. It will be appreciated that during this operation the jig serves to locate the core 107 with respect to the sleeve 106.

The combined sleeve and core are then removed from the jig and two panels 118 and 119 of electric insulating material are glued in position, these panels 118 and 119 each carrying two terminals 120.

The coils 109, 112 and 113 which have previously been wound are then placed over the arms 108, 110 and 111 and the coils are connected to the terminals 120, the coil 109 being connected between say the two terminals 120 carried by the panel 118 and the two coils 112 and 113 being connected in series between the two terminals 120 carried by the panel 119. As previously discussed the coils 112 and 113 are connected in series opposition and the position of these two coils on the arms 110 and 111 are adjusted so that when the coil 109 is energised with oscillatory current there is a minimum output from the series connected coils 112 and 113. (This adjustment is made without any magnetic bridge being provided across the ends of the arms 108, 110 and 111.)

The space between the sleeve 106 and the core 107 is then filled in known manner with a suitable "potting" material 121 which may, for example, be an epoxy resin.

When fitting a sensing device manufactured in the manner described above with reference to FIGURES 12, 13 and 14 into the stator 101, it is merely necessary to push the sleeve 106 into the appropriate hole 102 and then to rotate the sleeve 106 until the slot 122 is lined up with the appropriate slot 105 in the stator 101. The slots 105 and 122 have the same width and a special gauge which fits into these slots may be utilised to check when the sleeve 106 is correctly positioned relative to the stator 101. The position of the sensing device is then located by means of two set screws (not shown) which screw into the appropriate holes 123 in the stator 101. Prior to tightening these screws, some slight axial adjustment of the position of sensing device may be effected to compensate for any small error in the angular position of the slot 102 associated with that device, this adjustment being made by exciting the primary coil 109 and examining on an oscilloscope the output oscillations supplied by the coils 112 and 113 as the wheel 124 of this stage is rotated.

The construction described above with reference to FIGURES 10 to 14 may be applied to all the stages 5 to 10 of the apparatus 4. In the case of the stage 10 it is desirable for the arms 108, 110 and 111 of the core 107 to have tapered ends instead of flat ends and with this modification it is found that no further adjustment of the positions of the sensing devices is necessary.

It will be appreciated that although in the example of apparatus in accordance with the invention described above, the sensing devices are located around the circumference of the associated coding wheel, such an arrangement is not essential. All the devices of a stage of the apparatus may alternatively be disposed to one side of the appropriate wheel which, in this case, has slots in the face of the wheel, these slots being arranged in two concentric annular tracks and the two tracks lying respectively opposite the outer arms of the E-shaped core of each of the sensing devices.

Furthermore the invention is not restricted to apparatus having electromagnetic sensing devices. For example, a wheel, the angular position of which is to be measured, may have one or more windows through which light may pass to photo-electric cells which constitute the sensing devices.

We claim:

1. Position encoding apparatus comprising a wheel having an annular portion which is coaxial with the axis about which the wheel can rotate and which is made up alternately of 10 sections having a first value of a physical property and 10 sections having a second value of said physical property and each adjacent pair of first and second sections subtending an angle of 36 degrees at the axis of rotation of the wheel, five sensing devices each of which supplies an electric signal that is dependent upon the value of said physical property sensed by the device, and means to mount the five sensing devices to sense the value of said physical property of the annular portion of the wheel respectively at five spaced positions such that the angles subtended at the axis of rotation by successive pairs of the devices are 57.6, 57.6, 57.6, 57.6 and 129.6 degrees so that the five sensing devices supply electric signals that at any time during use are together characteristic of the angular position of the wheel.

2. Position encoding apparatus comprising a wheel having an annular portion which is coaxial with the axis about which the wheel can rotate and which is made up alternately of $10^N$ first sections having a first value of a physical property and $10^N$ second sections having a second value of said physical property, where N is a small integer, and each adjacent pair of first and second sections subtending an angle of $360/10^N$ degrees at the axis of rotation of the wheel, five sensing devices each of which supplies an electric signal that is dependent upon the value of said physical property sensed by the device, and means to mount the five sensing devices to sense the value of said physical property of the annular portion of the wheel respectively at five spaced positions such that the angles subtended at the axis of rotation by successive pairs of devices are $$720A/10^N-144/10^N,\ 720B/10^N-144/10^N,$$
$$720C/10^N-144/10^N,\ 720D/10^N-144/10^N$$

and $360-(720[A+B+C+D]/10^N-576/10^N)$ degrees, where A, B, C and D are integers, so that the five sensing devices supply electric signals that at any time during use are together characteristic of the angular position of the wheel.

3. Position encoding apparatus according to claim 1 wherein at least said annular portion is of ferromagnetic material and the sensing devices are each formed by a transformer, the annular portion being contoured to provide said sections so that the reluctance of a magnetic path associated with each transformer is dependent upon the particular section of the annular portion co-operating therewith at any time.

4. Position encoding apparatus according to claim 2 wherein the sensing devices are located around the circumference of the wheel.

References Cited by the Examiner

UNITED STATES PATENTS

| | | | |
|---|---|---|---|
| 2,597,866 | 5/22 | Gridley | 340—347 |
| 2,770,796 | 11/56 | Boer | 340—174.1 |
| 2,775,755 | 12/56 | Sink | 340—174 |
| 2,876,428 | 3/59 | Skelton | 340—174.1 |
| 2,909,717 | 10/59 | Hulls et al. | 235—154 X |
| 2,938,198 | 5/60 | Berman et al. | 340—347 |
| 2,942,252 | 6/60 | Wolff | 340—347 |
| 2,991,462 | 7/61 | Hose | 340—347 |
| 3,038,345 | 6/62 | Hoeppner et al. | 340—347 |
| 3,040,221 | 6/62 | Fitzner | 235—154 |

MALCOLM A. MORRISON, *Primary Examiner.*

EVERETT R. REYNOLDS, *Examiner.*